United States Patent

Söderberg

Patent Number: 5,715,655
Date of Patent: Feb. 10, 1998

[54] METHOD AND APPARATUS FOR WRAPPING

[76] Inventor: Staffan Söderberg, Hälleby Gård, S-150 16 Hölö, Sweden

[21] Appl. No.: 532,664

[22] PCT Filed: Feb. 9, 1994

[86] PCT No.: PCT/SE94/00102

§ 371 Date: Nov. 16, 1995

§ 102(e) Date: Nov. 16, 1995

[87] PCT Pub. No.: WO94/22718

PCT Pub. Date: Oct. 13, 1994

[30] Foreign Application Priority Data

Mar. 31, 1993 [SE] Sweden ............. 9301086

[51] Int. Cl.$^6$ .............. B65B 41/00; B65B 53/00
[52] U.S. Cl. .............. 53/441; 53/211; 53/587; 53/556; 53/389.3
[58] Field of Search .............. 53/441, 465, 556, 53/587, 211, 215, 389.3, 399

[56] References Cited

U.S. PATENT DOCUMENTS

| | | | |
|---|---|---|---|
| 4,077,179 | 3/1978 | Lancaster et al. | 53/211 X |
| 4,461,136 | 7/1984 | Hudson et al. | 53/211 X |
| 4,514,955 | 5/1985 | Mouser et al. | 53/556 X |
| 5,054,263 | 10/1991 | Maki-Rahkola et al. | 53/556 X |
| 5,189,866 | 3/1993 | Krutza | 53/587 |
| 5,450,711 | 9/1995 | Martin-Cocher | 53/211 X |

FOREIGN PATENT DOCUMENTS

WO92/17371  10/1992  WIPO ..................... 53/211

*Primary Examiner*—Linda Johnson
*Attorney, Agent, or Firm*—Pearne, Gordon, McCoy & Granger LLP

[57] ABSTRACT

A method for packaging bodies (1), primarily bales (1) of moist or wet animal-feed, by wrapping the body in a thin plastic film band (2), wherein a plastic web is wound onto the body in successive turns (3) while maintaining the web in tension. The web is taken from a magazine (4) while rotating the body about its longitudinal axis (5), which is preferably essentially horizontal, with the turns extending generally parallel with and transversely to the longitudinal axis, wherein wrapping of the body is terminated by gripping the web at a web part located between the magazine and the body, therewith severing the web. The method is mainly characterized in that the plastic web (2) is caused to extend transversely to the longitudinal axis (5) and herewith run from the magazine (4) essentially tangentially to the body (1) and transversely to the longitudinal axis, before the web is gripped at the web part located adjacent the body. This invention also relates to a body wrapping arrangement.

17 Claims, 2 Drawing Sheets

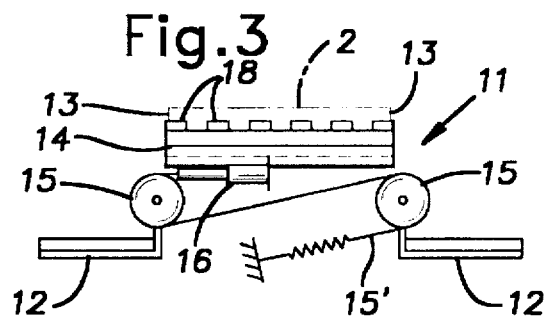
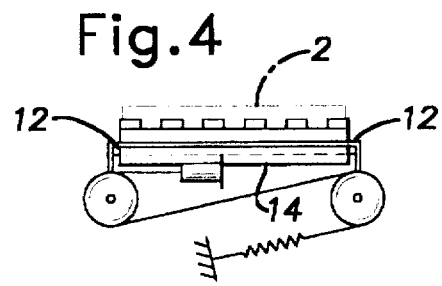
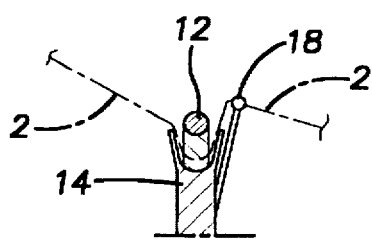
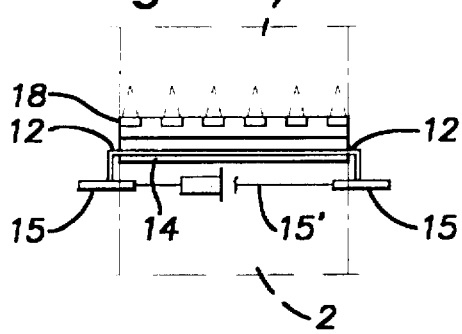
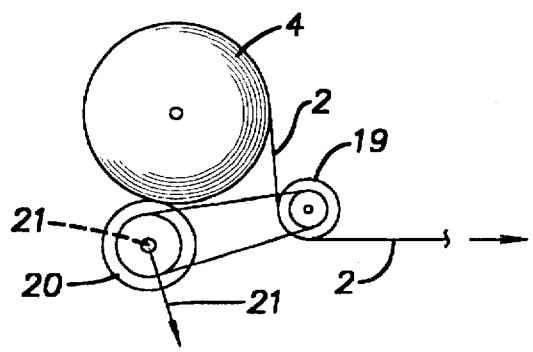
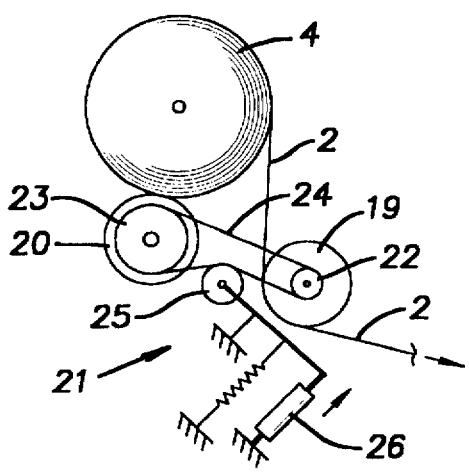

METHOD AND APPARATUS FOR WRAPPING

BACKGROUND OF THE INVENTION

The present invention relates to a method for packaging bodies, primarily moist or wet bales of cattle-feed, wherein a thin plastic web is wrapped around the body in successive turns while maintaining the web in tension, wherein the plastic web is taken from a magazine while simultaneously rotating the body around a preferably essentially horizontal longitudinal axis of the body, wherein said turns extend in a plane which includes essentially the aforesaid longitudinal axis, and wherein the wrapping process is terminated by gripping the plastic web at a web region between the magazine and the bale, such as to break the web.

The invention also relates to an arrangement for carrying out the method.

Methods of this general kind are known to the art. When wrapping bales of moist or wet horse-feed for storage in a bale silo, a bale is placed on a table with the longitudinal axis of the bale extending generally horizontally, and the bale is rotated about its longitudinal axis and the plastic web is wrapped around the bale in successive turns which essentially include the longitudinal axis of the bale, with the aid of rotators provided herefor, such as endless belts, and by rotating the table or swinging the film magazine at the same time. When wrapping of the bale is completed, the plastic web is gripped by means of a gripping device mounted on the table and the web is torn-off or severed in some other way.

One serious problem is that a considerable length of plastic web is left dangling freely from the bale, which has serious drawbacks. These dangling lengths of plastic web cause substantial disturbances in the surroundings when flapping in the wind, and tend to fasten in the branches of trees etc., and remain hanging from the bales for a long period of time. Furthermore, as a result of these loose ends film is unwound from the bales as the bales are handled, therewith exacerbating the aforedescribed problems and may cause the plastic sheet applied to the bale to lose some of its sealing effect.

SUMMARY OF THE INVENTION

The present invention provides a simple and effective solution to the aforesaid problems and enables the plastic film applied to be better utilized, among other things.

The invention thus relates to a method wherein a plastic web is taken from a magazine and wrapped around a body and wherein the plastic web is gripped at a web part adjacent the body while the web is running transversely to a longitudinal axis of the body.

The invention also relates to an arrangement including devices for applying a plastic web to a body, devices for gripping the plastic web, devices for severing the web, and devices to grip the web at a web part adjacent the body while the web is running tangentially to the body and transverse to a longitudinal axis of the body.

BRIEF DESCRIPTION OF THE DRAWINGS

The invention will now be described in more detail with reference to exemplifying embodiments thereof and also with reference to the accompanying drawing, in which

FIG. 3 illustrates the web gripping devices of FIG. 1 schematically and from the left in FIG. 1;

FIG. 4 illustrates the web gripping devices of FIG. 2 schematically and from the left in FIG. 2;

FIG. 5 is a schematic vertical section view of the gripping devices shown in FIG. 2;

FIG. 6 illustrates the gripping devices of FIG. 2 schematically and from above in FIG. 2;

FIG. 7 illustrates schematically an inventive device for activating and deactivating stretching of the plastic web; and FIG. 8 illustrates schematically a further inventive device for activating and deactivating stretching of the plastic web.

DETAILED DESCRIPTION OF THE PREFERRED EMBODIMENT

Figure 1:
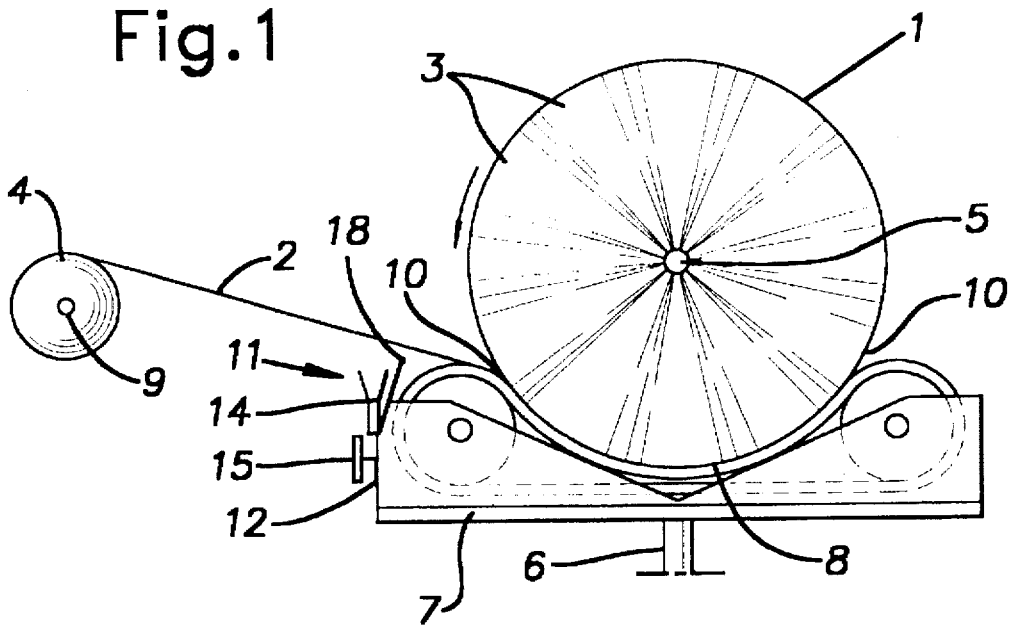
FIG. 1 illustrates schematically a first embodiment of an inventive arrangement as seen in the direction of the longitudinal axis of a body to be wrapped and in the width direction of the web of plastic film, wherein although the web is intended to be gripped it is shown in a free state, with the devices for gripping the plastic web shown in an inactive state.

In FIG. 1 the reference numeral 1 identifies a body in the form of a bale of animal-feed which is to be wrapped in thin plastic film 2, which is intended to be applied in successive turns 3 from a magazine 4 or storage reel while rotating the body around its preferably horizontal longitudinal axis 5 and while, in the case of the illustrated embodiment, simultaneously turning the body on an axle 6 which extends generally at right angles to the axis 5, said body being placed on a table 7 which is rotatable about the axle 6 and which includes transporters or rotators 8, such as endless belts 8, for rotating the body around the axis 5. Although not shown, the magazine is positioned generally vertically in this regard.

Figure 2:
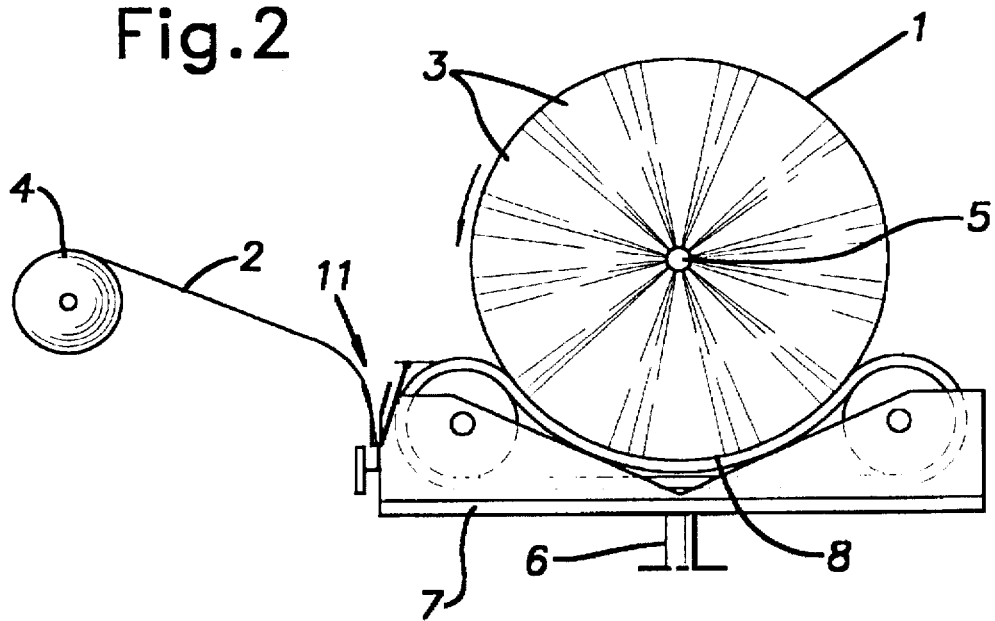
FIG. 2 illustrates the arrangement of FIG. 1 and shows web gripping means in an active gripping state.

Devices (not shown) are provided for placing the magazine 4 in a preferably generally horizontal position, shown in FIGS. 1 and 2, wherein the magazine axis 9 extends generally parallel to the long axis 5, and wherein the plastic web is intended to be wrapped around the body in successive turns 10 with the turns crossing earlier applied turns 3 along the outer surface of the body essentially parallel with the longitudinal axis thereof, as shown in FIG. 1. In the illustrated case, the plastic web moves circumferentially around the body transversely to the longitudinal axis 5, and enters from the magazine tangentially to the body and transversely to the longitudinal axis. The plastic web is preferably provided with an adhesive.

The reference numeral 11 identifies gripping devices which are intended to grip the length of plastic web extending from the magazine to the body transversely to the longitudinal axis thereof at a web part which lies adjacent the body, as shown in FIG. 2. In this regard, it is preferred that the plastic web runs into the body with its width direction essentially parallel with the longitudinal axis of said body and in beneath the body, wherein the gripping devices 11 are preferably disposed on the side 7 of the table 7 that extends parallel with said longitudinal axis, adjacent the transporters 8.

According to one preferred embodiment, the gripping devices 11 include two mutually opposing arms 12 or like devices which preferably extend essentially parallel with the longitudinal axis 5 in their active and inactive positions. The arms 12 are arranged to be moved-in over the plastic web extending transversely to the longitudinal axis, from respective longitudinally extending edge-part 13 of the web and to act against an anvil surface or counter-pressure surface 14 provided adjacent the body, as indicated in FIGS. 2 and 4. As the body is being wrapped, the arms 12 are held extended outwardly, away from each other, and preferably essentially parallel with the longitudinal axis 5.

According to one embodiment which is preferred in some cases, each of the arms is extended by means of a respective chain wheel 15 or corresponding wheel-like or roller-like device. Extending between the chain wheels 15 is a spring-loaded chain 15' or like movement transmitting means which coacts with the devices 15 and extends in a loop to a pulling device 16, such as a hydraulic piston-cylinder device or the like, so as to enable the devices 15 to be rotated in opposite directions and therewith respectively extend and fold the arms in towards and out away from each another and the anvil surface 14.

According to another embodiment of the gripping devices, the plastic web is intended to be gripped and firmly clamped by means of an arm which preferably extends generally parallel with said longitudinal axis in an active and an inactive state and which when gripping the web gathers the web together slightly and is extended over the plastic web from a position in which it is at least slightly beneath the plastic web and therewith act against an anvil surface mounted adjacent the body. During a wrapping operation, when in its inactive position the arm extends in a direction away from the plastic web, preferably generally parallel with the longitudinal axis 5.

The reference numeral 18 identifies tool parts which are disposed between the body and said arm/arms in a row along the anvil surface and preferably parallel with the arm/arms in mutually spaced relationship, these tool parts being intended to pierce through the plastic web as the web is gripped and therewith assist in tearing-off the web.

According to one preferred embodiment of the invention, the plastic web, which is drawn-off from the magazine, is intended to be stretched in a known manner as it is drawn from the magazine by means of a stretching roller 19 which rotates at a higher peripheral speed than the magazine reel, wherein the plastic web runs from the magazine via the web stretching roller, and wherein rotary movement of the roller is transmitted to a braking roller 20 which rolls against the magazine reel, as shown schematically in FIGS. 7 and 8. In accordance with the invention, the apparatus includes devices 21, shown schematically in the drawing, which function to cause stretching of the web to cease generally, so as to reduce generally the force required in the plastic web to pull the web from the storage reel, among other things in order to avoid the web slipping from the gripping devices when severing/pulling the web and starting a new body wrapping operation. As schematically illustrated, the devices 21 may have the form of devices (not shown) which function to disengage the braking roller from the web stretching roller and/or which function to lift the braking roller out of engagement with the storage reel, as indicated schematically by an arrow 21, wherein the storage reel will rotate at the same peripheral speed as the web stretching roller in both instances, the stretching roller otherwise rotating at a peripheral speed which is about 70% higher than the peripheral speed of the storage reel. The devices 21 for engaging and disengaging the braking roller may alternatively have the form of belt discs 22, 23 mounted adjacent the rollers 19 and 20 respectively, and a belt 24, for instance a four-slot V-profiled belt, which extends in tension between the belt discs 22, as shown in FIG. 8, and which transmits movement between the rollers but which when not in tension slips and disengages the braking roller 20. In the illustrated case, the belt is held tensioned by a spring-loaded tensioning roller 25 and is brought to a relaxed state by means of a pressing hydraulic piston-cylinder device 26 for instance, as illustrated in FIG. 8.

The braking roller is preferably spring biased so that as the storage reel becomes depleted of plastic film the roller will adjust to the varying diameter of the reel in a radial direction, wherein the braking roller is arranged to be moved out of contact with the storage reel through a predetermined, preferably short distance which is generally independent of the diameter of the storage reel. When appropriate, lifting devices, such as a hydraulic piston-cylinder device, may also be arranged to accompany the varying diameter of the storage reel in some suitable way, for instance with the aid of an attachment whose position also varies.

The method and the manner in which the inventive apparatus works will be understood in all essentials from the aforegoing.

After being wrapped around the body in successive turns in a plane which essentially includes said longitudinal axis, the web is caused to pass transversely to the longitudinal axis and to run out towards the storage reel adjacent the rotators and to be gripped in this position at a location adjacent the body and torn-off or otherwise severed by rotation of the body around said longitudinal axis and, when applicable, the free end of the web is fastened to the body upon continued rotation thereof. The two gripping arms are constructed so as to enable the arms to be extended away from one another as the plastic web is wrapped around the body, and are not brought into gripping engagement with the web until the web is positioned above the anvil surface.

This applies in the case of a single arm. After removing the wrapped or packaged body, a new body is placed in position while the plastic web running from the storage reel is held gripped by means of the gripping devices, whereafter wrapping of the new body is commenced.

In conjunction with terminating the wrapping of one body and commencing the wrapping of a new body, the tension in the web may be relaxed so that less force is required to pull the web from the storage reel, therewith eliminating the risk of the web loosening from the gripping devices.

It will be apparent from the aforegoing that the invention affords considerable advantages over the known technique. The plastic web is severed close to the body and the free end of the web can be wound onto the body transversely to the longitudinal axis and there secured. This eliminates the problem of long loose ends dangling from the wrapped bodies while affording functional severing of the web and functional termination and commencement of body wrapping operations. The turns that are wrapped in the circumferential direction of the body, and which are applied while maintaining the plastic web under tension, assist in holding the underlying turns of the web in tight and close relationship, therewith utilizing the plastic web more effectively and enabling the underlying wrapping to be reduced to a corresponding extent while retaining the function of the wrapping as a whole.

The ability to tension and to relax the plastic web provides a high degree of reliability in operation, thereby avoiding production shortfalls as a result of interrupted wrapping operations and the refastening of the plastic web by an operator, who often works alone and is often seated in a vehicle located at some distance from the wrapping station concerned.

Although the invention has been described with reference to exemplifying embodiments thereof it will be understood that other embodiments and minor changes and modifications are conceivable without departing from the concept of the invention. The invention can also be applied, of course, with methods and apparatus in which the magazine, or storage reel, can be swung around the body on an arm or like device, in which case a body is wrapped by rotating the body about its longitudinal axis and swinging the magazine around the bale before bringing the plastic web finally to a position in which the web is severed and fastened in accordance with the invention.

It will also be understood that the invention can be applied both to generally cylindrical bales and to generally parallelepipedic bales.

The invention is therefore not restricted to the aforedescribed and illustrated exemplifying embodiments thereof, since modifications can be made within the scope of the following claims.

I claim:

1. A body packaging method for packaging bales of animal-feed by wrapping the body in a thin web of plastic film, comprising the steps of:

taking a plastic web from a magazine reel;

wrapping the web around the body in successive turns while maintaining the web in tension and while rotating the body about its longitudinal axis;

terminating wrapping of the web around the body by performing the following steps:

gripping the plastic web at a part thereof located between the magazine reel and the body so as to prevent further dispensing of said web from said reel;

continuing to wrap the web around the body and thereby stretching the web;

breaking the web by stretching the web while wrapping same around the body.

2. A method according to claim 1, comprising the further steps of moving the plastic web toward the body and gripping the web while a width direction of said web extends generally parallel with said longitudinal axis.

3. A method according to claim 1 or 2, wherein the web is gripped and clamped by means of two arms (12) which extend preferably generally parallel with said longitudinal axis, said arms being extended grippingly across the plastic web from respective long sides (13) thereof and acting against an anvil surface (14) mounted adjacent the body.

4. A method according to claim 1 or 2, comprising the further step of severing the web at its gripped position while rotating the body about its longitudinal axis to thereby draw the plastic web in beneath said body.

5. A method according to claim 1 or 2, wherein the plastic web is stretched by means of a web stretching roller (19) which rotates at a higher peripheral speed than the magazine reel, and wherein the rotary movement of the web stretching roller is transmitted to a braking roller (20) which rolls on the magazine reel, and wherein tension on the web is gradually reduced so as to essentially reduce the force required to withdraw the web from the magazine reel.

6. A method according to claim 5, further comprising the step of ceasing to tension the web as wrapping of a body is commenced.

7. A body packaging arrangement for packaging bales of animal-feed by wrapping the body in thin plastic film, said arrangement comprising devices for applying a plastic web to the body, a magazine reel from which said plastic web is dispensed, said plastic web being applied in successive turns while maintaining the web in tension during rotation of the body about a longitudinal axis thereof, and wherein the arrangement further includes means for rotating said body and devices for gripping the plastic web at a part thereof located between the body and the magazine reel said gripping devices holding a web part which is located adjacent the body (1) while the web is dispensed from the magazine and wrapped on the body essentially tangentially to the body and transversely to said longitudinal axis (5) such that the web part is no longer applied to said body, said gripping devices cooperating with said body rotating means whereby further rotation of said body causes said web part between said body and said gripping devices to stretch and subsequently break.

8. Arrangement according to claim 7, further comprising devices (4, 11) for causing the plastic web to move into the body and be gripped with a width direction of the web essentially parallel with said longitudinal axis.

9. An arrangement according to claim 7 or 8, further comprising two arms (12), said arms extending essentially parallel with said longitudinal axis and serving to grip and clamp the plastic web, said arms extending over the plastic web from respective long sides (13) thereof and acting against an anvil surface (14) mounted adjacent the body.

10. An arrangement according to claim 9, wherein, during a wrapping operation, the arms (12) are extended outwardly away from one another and generally parallel with said longitudinal axis.

11. An arrangement according to claim 7 or 8, wherein the plastic web is gripped and clamped by means of an arm that extends generally parallel with said longitudinal axis and gathers the web together slightly when gripping said web, said arm being extended over the plastic web from a position in which the arm is located at least partially beneath said web and acts against an anvil surface mounted adjacent the body.

12. An arrangement according to claim 9, further comprising a row of mutually spaced tool parts (18) disposed between the body and the gripping devices (11) said tool parts being operable to pierce through the plastic web so as to facilitate severing of said web.

13. An arrangement according to claim 7 or 8, further comprising a body laying-off table (7) having a rotator (8) that rotates the body about said longitudinal axis, said gripping devices (11) being disposed adjacent said rotator (8) on a side (7) of the table extending parallel with said longitudinal axis.

14. An arrangement according to claim 9, further comprising chain wheels (15), a spring loaded chain (15'), and a pulling device (6), and wherein each of the arms (12) is extended by means of a respective chain wheel (15) and the spring-loaded chain (15') which extends in a loop between said chain wheels (15) to the pulling device (6), such that opposite rotation of the wheels extends the arms towards and away from each other and towards and away from said anvil surface (14).

15. An arrangement according to claim 7 or 8, further comprising web tensioning devices located adjacent the magazine, a web tensioning roller which rotates at a higher peripheral speed than the magazine reel, and devices for transmitting rotary movement of the tensioning roller to a braking roller that rolls against the magazine tool, said tensioning devices (21) are operable to reduce the force required to pull the plastic web from the storage reel.

16. An arrangement according to claim 15, wherein transmission of rotary movement of the web tensioning roller (19) to the braking roller (20) can be disengaged.

17. An arrangement according to claim 15, further comprising devices (21) for lifting the braking roller (20) out of contact with the magazine reel (4).

* * * * *